Figure 1:
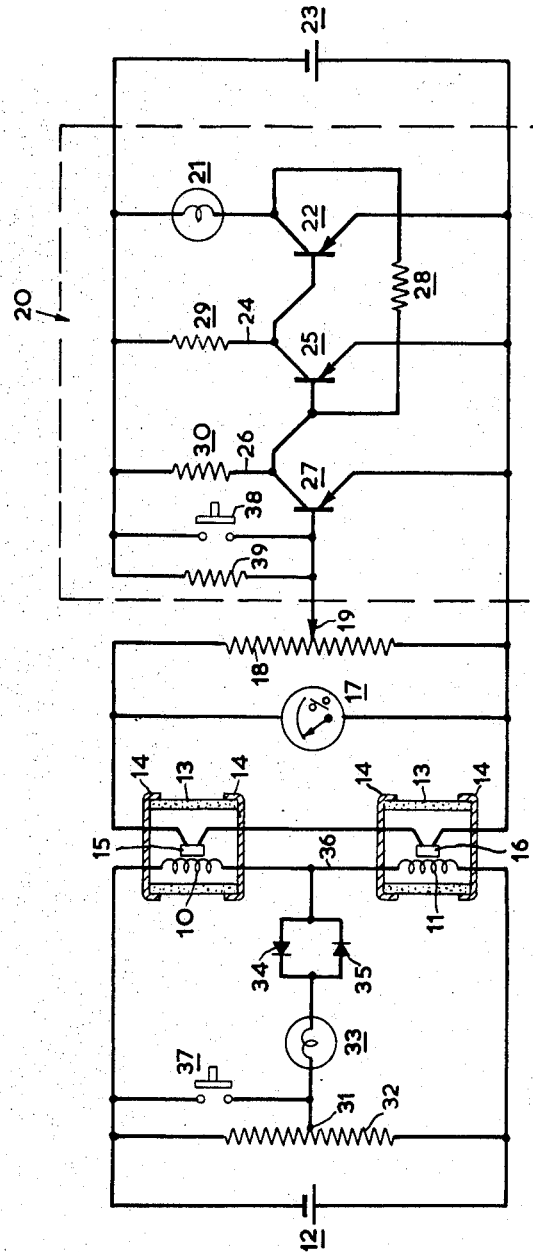

United States Patent Office 3,251,654
Patented May 17, 1966

3,251,654
COMBUSTIBLE GAS DETECTING ELEMENTS
AND APPARATUS
Thomas Henry Palmer, Stafford, England, assignor to
The English Electric Company Limited, London, England, a British company
Filed Feb. 16, 1962, Ser. No. 173,761
Claims priority, application Great Britain, Feb. 24, 1961,
6,842/61; Mar. 29, 1961, 11,485/61
2 Claims. (Cl. 23—255)

This invention relates to apparatus for detecting the presence of relatively small quantities of a combustible gas, such as for example methane, in an atmosphere, and to gas responsive elements for use in such apparatus.

According to the present invention a combustible gas detecting apparatus comprises, in combination, a gas responsive element arranged for exposure to an atmosphere under test and incorporating a material which in the presence of small quantities of the combustible gas acts as a catalyst to promote combustion of the gas on the element, thermo-electric means associated closely with the gas responsive element for producing an E.M.F. dependent on the temperature of the gas responsive element, and means responsive to the E.M.F. of the thermo-electric means for producing an indication or measure of the proportion of the combustible gas present in the atmosphere under test.

According to another feature of the present invention the apparatus also includes a temperature compensating element which includes a second thermo-electric means similar to the first thermo-electric means and similarly arranged for exposure to an atmosphere under test for providing an E.M.F. dependent on the temperature of the atmosphere, the said E.M.F. responsive means being responsive differentially to the E.M.F.'s of the two thermo-electric means so as to provide an indication which is substantially independent of variations in the temperature of the atmosphere under test.

According to another feature of the present invention the gas responsive element incorporates an electric heating element for raising the temperature of the gas responsive element to a predetermined high value whereby to increase the catalytic activity of the catalytic material, and the temperature compensating element also includes an electric heating element for simliarly raising the temperature of the temperature compensating element to the said predetermined high value.

According to another feature of the present invention each thermo-electric means comprises a thermo-couple having its hot junction enclosed within an electrically-insulating tubular member around which the associated heating element is wound, the said catalytic material in the case of the gas responsive element enveloping the electric heating element and associated tubular member.

Each electric heating element may be encased if desired in a layer of refractory material for preventing deterioration of the heating element, the layer of refractory material being impervious to the combustible gas and in the case of the gas responsive element carrying the said catalytic material.

According to another feature of the present invention the apparatus also includes an auxiliary electric circuit connected at one end to the junction of the two heating elements and at its other end to a point of similar potential adjacent a heating element supply source, the auxiliary circuit including in series a heating element failure warning device and a parallel-connected opposed-diode combination for preventing operation of the warning device except when on failure of a heating element a substantial voltage is developed across the auxiliary circuit.

Preferably the apparatus also includes an ON/OFF type amplifying device controlled by a voltage dependent on the net E.M.F. developed by the two thermo-electric means, and a gas warning device for energisation by the amplifying means when the proportion of the combustible gas present in the atmosphere under test rises above a predetermined value.

One combustible gas detecting apparatus according to the present invention for detecting the presence of small quantities of methane in an atmosphere in a coal mine will now be described by way of example and with reference to the accompanying drawings.

Figure 2:
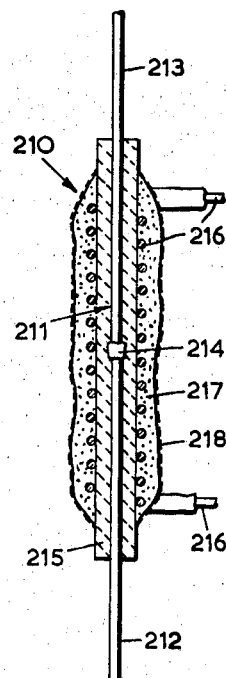
Figure 3:
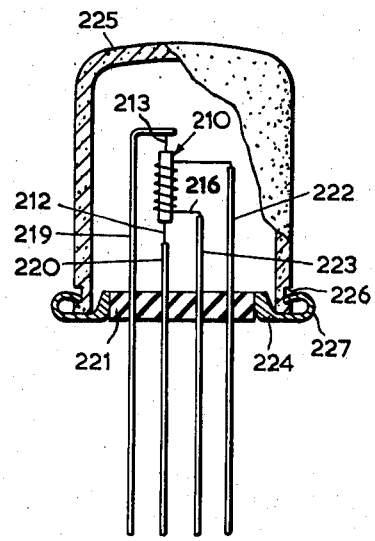
Figure 4:
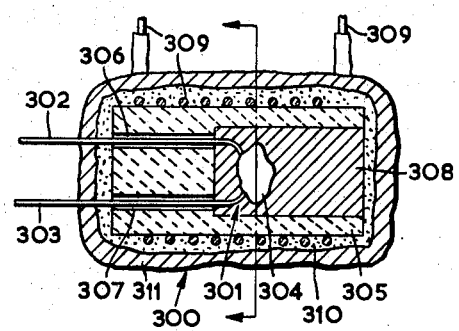
Figure 5:
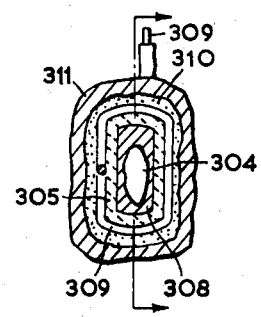

FIG. 1 shows diagrammatically the electric circuit connections of the apparatus, FIG. 2 shows a part-sectional side elevation of an alternative form of methane responsive device for use in the apparatus of FIG. 1, FIG. 3 shows a part-sectional side elevation of a unit in which the device shown in FIG. 2 is mounted for operation in the apparatus, and FIGS. 4 and 5 show side and end sectional views respectively of a further alternative form of methane responsive device for use in the apparatus, these two views being taken on the sections indicated in the figures.

Referring now to FIGURE 1 the apparatus includes two electrically-similar platinum wire resistors or heating elements 10, 11 connected in series for energisation from a battery 12. The resistors 10, 11 are enclosed within two separate similar closed vessels each comprising a porous ceramic tube 13 and end caps 14 secured to the ends of the tube.

Associated with resistors 10, 11 are two similar thermo-couples 15 and 16, the thermo-couples being in good thermal contact with the resistors, but being electrically insulated therefrom. In the figure, however, the thermo-couples are shown spaced away from the resistors merely for the sake of clarity.

The platinum wire of the resistor 10 is of the activated type, its surface having adherent thereto a large number of small particles of platinum which when methane is present in the atmosphere surrounding the resistor promote by a catalytic action the combustion of the methane on the resistor, thus heating the resistor. The resistor 10 thus constitutes the methane responsive element of the apparatus.

The platinum wire of the resistor 11 is of the unactivated type, and is thus substantially uninfluenced by the presence of methane in contact therewith. This resistor 11 constitutes the temperature compensating element of the apparatus.

The ceramic tubes 13 of the closed vessels are arranged to be of such a porosity that gases present in an atmosphere outside the vessels can diffuse readily into the closed vessels at a rate sufficient to enable the combustion of methane on the methane responsive resistor 10 to take place at a rate proportional to the proportion of methane in the atmosphere outside the vessels and without causing any substantial change in the gas pressure inside the closed vessel enclosing the resistor 10.

The thermo-couples are connected in series in a manner such that their E.M.F.'s act in opposition to one another. Since the thermo-couples have the same electrical characteristics, in the absence of methane the net E.M.F. produced by the two thermo-couples is of zero value. Any change in the temperature of the atmospheric gases influences both thermo-couples in the same manner so that no change in the net thermo-couple E.M.F. results, any consequent change in the output of the thermo-couple 11 being offset by a similar change in the output of the thermo-couple 16. On the other hand in the presence of methane the temperature of the resistor 10 is increased, thus increasing the output E.M.F. of the thermo-couple 15 relative to that of the thermo-couple 16.

A millivolt meter 17 is connected across the series-connected thermo-couples 15 and 16 so as to be energised in accordance with the net E.M.F. produced by the thermo-couples, and is suitably calibrated in terms of the percentage of methane present in the atmosphere.

A potentiometer 18 connected in parallel with the millivolt meter 17 provides a potential at an adjustable output tapping 19 for driving an ON/OFF type transistor amplifier generally indicated at 20, the latter being arranged as will appear from the later description to illuminate a red "methane" warning lamp 21 when the percentage of methane present in the atmosphere rises above a predetermined high value.

The warning lamp 21 is connected in the collector circuit of a PNP type amplifying transistor 22 which has a collector-emitter potential provided by a battery 23, and a base potential provided by the collector circuit 24 of a further PNP amplifying transistor 25. The collector-emitter circuit of the latter transistor is also connected across the battery 23, and the base potential of this transistor is provided by the collector circuit 26 of a PNP type isolating transistor 27. As in the case of the other transistors the battery 23 provides the collector-emitter potential for the transistor 27, but the base potential of this latter transistor is derived from the output tapping 19 of the potentiometer 18.

The base of the transistor 25 is electrically connected through a resistor 28 with the collector circuit of the transistor 22 so as to provide positive feedback for producing the desired ON/OFF switching action when the base of the transistor 25 passes through a predetermined negative potential.

Resistors 29 and 30 are connected as collector loads in the collector circuits of the transistors 25 and 27 respectively.

In operation in the absence of methane the two thermo-couples produce equal and opposite E.M.F.'s so that no current flows in the millivolt meter 17 in the potentiometer 18. The potential of the tapping 19, and consequently of the base of the transistor 27, is thus of zero value relative to the emitter of transistor 27 so that the latter is rendered non-conducting. The base of the transistor 25 is consequently at a high negative potential relative to the emitter, being the potential of the battery negative terminal, so that this transistor conducts. The base of the transistor 22 is consequently at a low negative potential relative to that of the emitter, this potential being insufficient to cause the transistor 22 to conduct. The methane warning lamp 21 is thus unenergised.

If the methane content in the atmosphere rises above the zero value, the combustion of methane on the heating element 10 raises the temperature of the thermo-couple 15 above that of the thermo-couple 16 so that a net thermo-couple E.M.F. appears across the potentiometer 18 and millivolt meter 17. The latter indicates visually the percentage methane content, whilst the flow of current through the potentiometer 18 causes the potential of its output tapping 19 to fall in a negative sense relative to the emitter of transistor 27 thus applying a negative potential to the base of the transistor 27. As this negative potential increases the transistor 27 conducts, and the current flowing in its collector circuit increases with further increase in the negative potential of the base. As the collector current of the transistor 27 increases the voltage developed across its collector load 30 increases and thereby causes the potential of the collector to rise towards that of the emitter thus reducing the negative potential applied to the base of the transistor 25.

In response to the decreasing negative base potential of the transistor 25 the collector current of this transistor falls, thus raising in a negative sense the potential applied to the base of the transistor 22. The latter begins to conductor current, and the consequential rise in collector potential assists in the action of cutting off the transistor 25, and the consequent increase to saturation of the collector current of transistor 22, when the potential of the base of transistor 25 rises to the value indicative of the predetermined high methane content. The methane warning lamp is consequently illuminated rapidly so as to indicate the presence of the predetermined high percentage of methane in the atmosphere.

As the methane content subsequentially falls below the aforesaid high value the current flowing in the potentiometer 18 falls, thus reducing the negative base potential applied to the transistor 27. The resulting fall in the collector current of this transistor raises the potential of the base of transistor 25 in a negative sense thereby causing the latter transistor to conduct. The fall in its collector potential results in a decrease in the collector current of the transistor 22 thus extinguishing the methane warning lamp 21 and the increase of the collector potential of this transistor 22 in a negative sense assists in transferring the flow of current rapidly from the transistor 22 to the transistor 25.

In the event of the failure of one of the thermo-couples 15 or 16, the base potential of the transistor 27 falls to zero value, thus preventing any illumination of the methane warning lamp 21. Furthermore in the event of the failure of either of the heating elements 10 or 11 no current can flow in the thermo-couples, in the millivolt meter, and in the potentiometer, so that such a failure cannot result in the false illumination of the methane warning lamp.

In order to indicate automatically the presence of an "open-circuit" in either of the heating elements 10 or 11 a centre tapping 31 of a potential divider 32 connected across the battery 12 is connected through a "heater failure" indicating lamp 33 and a pair of parallel-connected opposed diodes 34, 35 to the connection 36 joining the two heating elements in series. Under normal operating conditions the potential applied across these diodes results in the flow of only a negligibly small current through the heater failure lamp so that it remains extinguished. However, when an open-circuit develops in either of the heating elements the potential then appearing across the diodes is such as to cause a current to flow therethrough which is large enough to illuminate the heater failure warning lamp.

A push button switch 37 connected in parallel with the upper half of the potential divider 32 enables the full potential of the battery 12 to be applied across the diodes 34, 35 whereby to test the condition of the heater failure warning lamp 33.

A further push button switch 38 is provided in the amplifier 20 so as to enable the base of the transistor 27 to be connected temporarily with the negative terminal of the battery 23 whereby to test the operation of the amplifier and methane warning lamp 21.

The transistor 27 is used to isolate the amplifying transistors 25 and 22 from the potentiometer 18 so as to ensure that the methane warning lamp 21 is not falsely illuminated as a result of the failure of one of the thermo-couples 15 or 16.

The order of connecting the transistors in the amplifier 20 may be modified, as for example, by exchanging the positions of the methane warning lamp 21 and the collector load 30, by connecting the base of transistor 25 directly to the output tapping 19 of the potentiometer 18, and by connecting the base of the transistor 27 to the collector of transistor 22. In such a modified circuit arrangement the potential of the tapping 19 directly influences the transistors 25 and 22, whilst the collector circuit of the transistor 22 directly controls the isolating transistor 27 whereby to control the illumination of the methane warning lamp 21.

The millivolt meter may, if desired, be connected alternatively in the collector circuit of the transistor 27 in series with the load 30, or in the collector circuit of an additional transistor (not shown) whose base potential is obtained from a further adjustable potentiometer connected in parallel with the potentiometer 18.

If it is desired to obtain illumination of the methane warning lamp 21 at a low net thermo-couple E.M.F. such as will produce at the tapping 19 a negative voltage which is less than that at which the transistor 27 begins to conduct, it is necessary to provide means for establishing at the base of the transistor 27 a predetermined constant negative bias potential sufficient to enable illumination of the methane warning lamp to be obtained at the desired low net thermo-couple E.M.F. Such means may comprise, for example, a resistor 39 of high resistance value connecting the output tapping 19 of the potentiometer 18, and hence the base of the transistor 27, with the negative terminal of the battery 23 for enabling a predetermined bias current to flow in the lower part of the potentiometer 18.

The rudimentary methane responsive device described above and comprising the element 10 and the thermo-couple 15 will in practice preferably take a more advanced form such as that shown in the FIGURES 2 and 3.

Referring therefore to the FIGS. 2 and 3, the methane responsive device shown generally at 210 incorporates a thermo-couple generally indicated at 211 which comprises two fine wires 212, 213 of dissimilar electrically-conducting metals joined end to end at a "hot" junction 214 by butt welding. The thermo-couple is enclosed in a thin-walled glass sleeve 215 formed by heating a glass tube of suitably small cross section and diameter after first inserting the thermo-couple therein so as to cause the glass wall of the tube to soften and form closely around the thermo-couple.

A platinum wire heater coil 216 carried externally on the glass sleeve 215 is secured in position with the thermo-couple junction 214 mid-way between the ends of the coil by a layer of a refractory material 217 (e.g. alumina or glass) which is impervious to methane and which thus prevents vaporization of the platinum wire when the methane responsive device is in operation.

The refractory material 217 carries externally a coating of a catalytic material 218 for promoting the combustion of methane on the outer surface of the gas detecting element.

The methane responsive device 210 is supported in the manner shown in FIG. 3 by the thermo-couple wires 212, 213 being connected mechanically and electrically at their ends to electrically-conducting support posts 219, 220 which are mounted in an electrically-insulating non-porous base member 221 and which pass therethrough to serve as terminals for the thermo-couple. Two further electrically-conducting posts 222, 223 also mounted in the base member 221 and passing therethrough so as to act as terminals for the heater coil 216 are connected mechanically and electrically to the ends of the heater coil.

The base member 221 carries an external metal collar 224, and a porous sintered metal (alternatively ceramic) cap or thimble 225 placed over the methane responsive device 210 is secured in position against the metal collar 224 by the engagement in a recess 226 formed externally in the thimble of a lip 227 of the collar 224.

The sintered metal thimble 225 is arranged to be of such a porosity that methane present in the atmosphere outside the thimble diffuses through the thimble wall at a rate such that the consequent combustion of methane on the surface of the methane responsive device 210 occurs at a rate dependent on the percentage content of methane present in the atmosphere outside the thimble, and without causing any appreciable change in the pressure inside the thimble.

The catalytic coating 218 is formed on the external surface of the layer of refractory material 217 by the repeated application thereto of an aqueous solution of platinum, palladium, and a promoter such as aluminum, each such application being followed by a period of drying in which the element is fired at a low temperature by passing a high current through the heater coil. After several such applications of this solution the layer of refractory material 217 becomes coated with a layer of finely divided catalytic material. It has been found that the lower the temperature at which the solution is dried, the smaller the size of the particles of the catalytic material, and hence the larger the active surface area of the catalytic material for promoting combustion of methane. Consequently the desired catalytic action can be obtained at a lower operating temperature of the catalytic material. This enables a lower heater current, and consequently heater power, to be used in operating the gas detecting apparatus.

Whereas in the FIGURES 2 and 3 the methane responsive device 210 is mounted perpendicularly to the insulating base member 221, the posts for supporting the thermo-couple may be arranged so as to support the methane responsive device in any other convenient disposition, for example, with the device disposed parallel to the base member 221.

In order to avoid "cold" junctions within the thimble 225 at the junctions of the thermo-couple wires and the support posts 219, 220, in a modified unit the support posts 219, 220 are omitted and the thermo-couple wires are carried through the base member 221 and serve as support posts for the whole device 210.

Whereas the atmosphere outside the enclosure (i.e. the thimble 225 and the base member 221) diffuses through the porous thimble only, in a modified unit the enclosure comprises a porous base member and a thimble which is constructed of a non-porous tube and a porous end disc closing the free end of the tube. With such a modified enclosure construction the rate of diffusion of the gases through the enclosure can be readily controlled during the manufacturing stages by grinding the end disc and the base member so as to adjust their thicknesses to desired values.

When making the methane responsive device the step of heating the glass tube so as to form the wall of the tube closely about the thermo-couple may be omitted if desired provided that the internal diameter of the glass tube is small enough to give rise to sufficient frictional resistance between it and the thermo-couple as to maintain the latter in the desired spatial relationship relative to the heater coil.

If the heater coil 16 is constructed of some material other than platinum which is not subject to evaporation when methane burns on its surface, or if the methane responsive device is intended for use in atmospheres having a methane content such that evaporation of the platinum wire is unimportant, the layer of refractory material 217 may be omitted and the coating of catalytic material 218 applied directly to the heater coil.

Gas detecting devices similar to that just described above may be used for detecting other combustible gases provided that the catalytic materials used in their construction are such as to promote the desired combustion of the gases to be detected. Different gases may require the use of different catalytic materials, for example where hydrogen is to be detected a coating of finely divided palladium may be used as the layer of catalytic material.

The aforesaid methane responsive device of FIG. 1 may alternatively take a further more advanced form shown in the FIGURES 4 and 5.

Referring therefore to the FIGS. 4 and 5, the methane responsive device shown generally at 300 incorporates a thermo-couple generally indicated at 301 which comprises two fine wires 302, 303 joined at a junction 304. The latter is disposed centrally in an alumina tubular member 305 which is closed at one end, and the thermo-couple wires pass through holes 306, 307 formed in the closed end of the tubular member for connection to electrically conducting support posts not shown. The tubular member is provided with a filling of alumina cement 308 in which the thermo-couple junction 304 is embedded so as to ensure good heat transmission between the tubular member and the thermo-couple junction.

A platinum wire heater coil 309 is carried externally on the tubular member 305 and is secured in position with the thermo-couple junction mid-way between the ends of the coil by a layer of non-porous refractory material 310. The latter is impervious to methane and hence prevents the ingress of methane and the consequent deterioration of the heater coil which would otherwise be obtained when in operation.

The layer of non-porous refractory material 310 carries externally a layer 311 of a porous alumina cement which like the layer of refractory material 217 of the previously described methane responsive device 210 has been subjected to repeated applications of the said catalytic material producing solution and which thus has its surfaces coated with finely divided catalytic material.

This second methane responsive device is mounted in a manner similar to that shown in FIG. 3 in a capsule into which methane present in the atmosphere outside the capsule may diffuse.

The rudimentary temperature compensating device described above with reference to FIG. 1 and comprising the element 11 and the thermo-couple 16 will in practice take a more advanced form which will be generally similar to that of the selected more advanced form of methane responsive device 210 or 300, with the exception that no catalytic material such as 218 or 311 will be incorporated. In this way the methane responsive device and the temperature compensating device will be caused to have substantially the same response to variations in the temperature of the atmosphere which is being tested.

What I claim as my invention and desire to secure by Letters Patent is:

1. In a combustible gas detecting means for detecting the presence of small quantities of a combustible gas in an atmosphere under test, two thermo-couples connected electrically in series with one another so that their thermo-E.M.F.'s oppose one another, around each such thermo-couple a thin-walled closely-fitting sleeve of an electrically-insulating thermally-conductive material, two electric heating coils carried on the two sleeves respectively so as when energised to similarly heat the sleeves to a predetermined high temperature, the coils being connected electrically in series for energisation by a common heating current, a layer of a catalytic material for promoting combustion of the combustible gas disposed on one only of the sleeves and enveloping the heating coil carried thereon, means responsive to the net thermo-E.M.F. produced by the thermo-couples for indicating the proportion of the combustible gas present in an atmosphere under test, a resistor connected in parallel with the two heating coils and having a central tapping, an auxiliary circuit connected between the said tapping and the junction of the heating coils and including in series connection a heating coil failure warning device and a pair of parallel-connected opposed diodes for preventing operation of the warning device except when on a failure of a heating coil a substantial voltage is developed across the auxiliary circuit, the aforesaid catalytic material and its associated heating coil, sleeve and thermo-couple together constituting a combustible gas responsive element, and the other heating coil and associated sleeve and thermo-couple constituting an atmospheric temperature compensating element, and the two elements being similarly arranged for exposure to the atmosphere under test.

2. In a combustible gas detecting means for detecting the presence of small quantities of a combustible gas in an atmosphere under test, two thermo-couples connected electrically in series with one another so that their thermo-E.M.F.'s oppose one another, around each such thermo-couple a thin-walled closely-fitting sleeve of an electrically-insulating thermally-conductive material, two electric heating coils carried on the two sleeves respectively so as when energised to similarly heat the sleeves to a predetermined high temperature, the coils being connected electrically in series for energisation by a common heating current, a layer of a catalytic material for promoting combustion of the combustible gas disposed on one only of the sleeves and enveloping the heating coil carried thereon, an ON/OFF transistor amplifying means controlled in dependence upon the net E.M.F. of the two thermo-couples, a combustible gas warning device for energisation by the amplifying means when the proportion of the combustible gas present in an atmosphere under test rises above a predetermined value, and a power source in circuit with said warning device and amplifying means for energizing said device when the amplifying means is in the ON state and being cut off from said device when the amplifying means is in the OFF state, the aforesaid catalytic material and its associated heating coil, sleeve and thermo-couple together constituting a combustible gas responsive element, and the other heating coil and associated sleeve and thermo-couple constituting an atmospheric temperature compensating element, and the two elements being similarly arranged for exposure to the atmosphere under test.

References Cited by the Examiner

UNITED STATES PATENTS

| | | | |
|---|---|---|---|
| 2,234,128 | 3/1941 | Miller | 23—232 |
| 2,335,032 | 11/1943 | Sullivan | 23—232 |
| 2,583,930 | 1/1952 | Cotton | 23—255 |
| 2,768,069 | 10/1956 | Thompson | 23—255 |

FOREIGN PATENTS

| | | |
|---|---|---|
| 333,498 | 3/1921 | Germany. |
| 924,353 | 2/1955 | Germany. |

OTHER REFERENCES

Taylor: "J. Ind. and Engineering Chem.," 12, 797 (1920).

Taylor, Jr.: "Instrumentation," vol. 5, pp. 35, 36 (1952).

MORRIS O. WOLK, *Primary Examiner.*

MAURICE A. BRINDISI, *Examiner.*

D. E. GANTZ, H. A. BIRENBAUM,
*Assistant Examiners.*